US010276917B2

(12) United States Patent
Christiansen et al.

(10) Patent No.: US 10,276,917 B2
(45) Date of Patent: Apr. 30, 2019

(54) DATA TRANSMISSION SYSTEM HAVING CONSUMPTION METER AND REVERSIBLY DEFORMABLE ANTENNA

(71) Applicant: Kamstrup A/S, Skanderborg (DK)

(72) Inventors: Johnny Dørken Christiansen, Galten (DK); Claus Jørgensen, Nørresundby (DK); Lasse Pilegaard, Horsens (DK)

(73) Assignee: KAMSTRUP A/S, Skanderborg (DK)

( * ) Notice: Subject to any disclaimer, the term of this patent is extended or adjusted under 35 U.S.C. 154(b) by 47 days.

(21) Appl. No.: 15/323,687

(22) PCT Filed: Jul. 2, 2015

(86) PCT No.: PCT/DK2015/050198
§ 371 (c)(1),
(2) Date: Jan. 3, 2017

(87) PCT Pub. No.: WO2016/000722
PCT Pub. Date: Jan. 7, 2016

(65) Prior Publication Data
US 2017/0162930 A1 Jun. 8, 2017

(30) Foreign Application Priority Data
Jul. 4, 2014 (EP) .................................... 14175730

(51) Int. Cl.
G08B 21/00 (2006.01)
H01Q 1/22 (2006.01)
(Continued)

(52) U.S. Cl.
CPC ......... H01Q 1/2233 (2013.01); H01Q 1/1214 (2013.01); H01Q 7/00 (2013.01); H04B 5/0043 (2013.01)

(58) Field of Classification Search
CPC ...... H01Q 1/1214; H01Q 1/2233; H01Q 7/00; H04B 5/0043
(Continued)

(56) References Cited

U.S. PATENT DOCUMENTS 4,040,046 A * 8/1977 Long ..................... G01D 4/004
                                                   340/10.1
5,659,300 A * 8/1997 Dresselhuys .......... G01D 4/006
                                                   340/10.41
(Continued)

FOREIGN PATENT DOCUMENTS

CN    202 158 883 U        3/2012
DE    10 2007 008469 A1    8/2008
GB    2 326 002 A           12/1998

OTHER PUBLICATIONS

International Search Report for corresponding patent application No. PCT/DK2015/050198 dated Sep. 22, 2015.

Primary Examiner — Mark S Rushing
(74) Attorney, Agent, or Firm — Renner, Otto, Boisselle, & Sklar, LLP

(57) ABSTRACT

A data transmission system (600) for transmitting consumption data from a consumption meter (100) is provided, wherein the system (600) comprises the consumption meter (100) arranged to measure a volume of a supplied utility and comprising a housing (110) with an outer surface (112); a control circuit arranged in the housing to generate a signal indicative of the volume of the utility; and a transmitter (40) arranged in the housing and being connected to the control circuit and arranged for transmitting the signal indicative of the volume of the utility; and a transmission coupler module (200) comprising a housing adaptor (210) which fits onto the outer surface (112) of the housing (110); and a conductive element (220) arranged with the housing adaptor (210) and being near-field coupled to the transmitter (140), wherein the
(Continued)

conductive element (220) is removably arranged with the housing adaptor (210). The data transmission system has high transmission efficiency.

20 Claims, 4 Drawing Sheets

(51) Int. Cl.
  *H01Q 1/12* (2006.01)
  *H01Q 7/00* (2006.01)
  *H04B 5/00* (2006.01)
(58) Field of Classification Search
  USPC .................................................. 340/870.02
  See application file for complete search history.

(56) References Cited

U.S. PATENT DOCUMENTS

| | | | |
|---|---|---|---|
| 6,369,769 B1 | 4/2002 | Nap et al. | |
| 6,414,605 B1 * | 7/2002 | Walden | G01D 4/008 |
| | | | 340/870.02 |
| 8,847,840 B1 * | 9/2014 | Diaz | H01Q 1/364 |
| | | | 343/793 |
| 2010/0302061 A1 * | 12/2010 | Winter | G01F 15/063 |
| | | | 340/870.02 |
| 2012/0098710 A1 * | 4/2012 | Seal | H01Q 9/16 |
| | | | 343/702 |
| 2012/0286770 A1 * | 11/2012 | Schroder | H05B 37/0272 |
| | | | 324/113 |

\* cited by examiner a)  b)

DATA TRANSMISSION SYSTEM HAVING CONSUMPTION METER AND REVERSIBLY DEFORMABLE ANTENNA

This application is a national phase of International Application No. PCT/DK2015/050198 filed Jul. 2, 2015 and claims priority to European Application No. 14175730.2 filed Jul. 4, 2014 and published in the English language.

FIELD OF THE INVENTION

The present invention relates to a data transmission system for transmitting data from a consumption meter. In particular the invention relates to a transmission system with a consumption meter and a transmission coupler module, and to a transmission coupler module.

BACKGROUND OF THE INVENTION

A consumption meter may be used for measuring utility usage in connection with supply of the utility, e.g. of water, gas, heating, or cooling, such as distributed water supply, distributed gas supply, district heating, or district cooling and may in turn be used in connection with charging of the consumed quantity of the utility.

Such consumption meters may operate by way of wireless data transmission, such as by way of wireless radio frequency data transmission.

Wireless data transmission from consumption meters placed at the premises of a consumer offers a number of advantages: The need for on-site reading is eliminated, which otherwise may involve labour intensive and time consuming and in turn costly processes. Further, wireless transmission offers advantages in terms of the option of more frequent and close monitoring and control of utility consumption, as well as the elimination of human errors related to manual reading procedures.

With wireless transmission, however, power management in terms of management of the power consumption of the transmission system of the consumption meter is essential. In particular with consumption meters with no external power supply, such as water, heating and cooling meters, which are traditionally battery powered, the lifetime of consumption meters is likely defined by the lifetime of the battery, and transmission power should preferably be closely controlled and minimized.

On the other hand, in particular with below-ground applications like pit and basement applications, the demands on the transmission system are high. With such applications, due to interference, reflection and absorption, signal transmission is often heavily attenuated, and it is essential that the consumption meter provides optimal transmission efficiency relative to its power consumption.

One approach hereto is to arrange a transmission system with the lid of a pit to minimize signal attenuation. Thus as disclosed with U.S. Pat. Nos. 5,298,894 and 5,825,303 to Badger Meter, Inc. a transmitter system in terms of a transponder and an antenna assembly is arranged at a pit lid, for converting data signals received from a consumption meter in the pit to radio frequency signals for transmission via the antenna.

Another approach relates to more modern consumption meters which comprise transmitters integrated with the body of the consumption meter. Although such integrated transmitters offer elegant solutions, their transmission power may be limited. Thus U.S. Pat. No. 6,262,685 to Itron, Inc. discloses a consumption meter in which an integrated transmitter is coupled to an external radiator for wireless communication therefrom to obtain an improved transmission over transmission directly from the integrated transmitter.

Also U.S. Pat. No. 6,369,769 to Innovatec Communications, LLC relates to a consumption meter with an integrated transmitter. The consumption meter has an antenna coupled thereto by means of a cable, the antenna being arranged in an antenna housing with a pit lid. The coupling from the consumption meter to the cable is capacitive or inductive by means of an antenna receptor arranged in a separate housing at the exterior of the consumption meter.

Similar approach is applied with German Patent Application DE 10 2007 008 469 A1 to Techem Energy Services GmbH, wherein a communication unit for transmission of measurement data from a utility meter comprises a primary antenna arranged with the communication unit and a secondary antenna arranged at the exterior of the housing of the communication unit, and being coupled to the primary antenna by means of near-field coupling.

Still, however, there is a need for data transmission systems for consumption meters, in particular for consumption meters for below-ground applications, with high transmission efficiency and simple mechanical handling.

SUMMARY OF THE INVENTION

Accordingly it would be advantageous to achieve a data transmission system to fulfil the above need.

Thus, according to a first aspect of the invention a data transmission system for transmitting consumption data from a consumption meter is provided, the system comprising:
 the consumption meter arranged to measure a volume of
  a supplied utility and comprising:
   a housing with an outer surface;
   a control circuit arranged in the housing to generate a signal indicative of the volume of the utility; and
   a transmitter arranged in the housing, the transmitter being connected to the control circuit and arranged for transmitting the signal indicative of the volume of the utility; and
 a transmission coupler module comprising:
   a housing adaptor which fits onto the outer surface of the housing; and
   a conductive element arranged with the housing adaptor and being near-field coupled to the transmitter,
 characterized in that
 the conductive element is removably arranged with the housing adaptor.

With the subject data transmission system a system of a consumption meter and a transmission coupler module is thus provided, wherein the housing adaptor of the transmission coupler is capable of fitting onto the housing of the consumption meter, so that the conductive element of the transmission coupler module is able to communicate with the transmitter of the consumption meter. According to the invention, the housing adaptor and the conductive element of the transmission coupler module are further arranged so that the conductive element is removably arranged with the housing adaptor.

In the context of the present invention "a transmission coupler module" is a module which is able to couple to a consumption meter, mechanically as well as electrically, to allow communication in terms of signal transmission between the consumption meter and the transmission coupler module, and optionally to any further devices in a communication chain, like an antenna module.

Further in the context of the present invention "a housing adaptor" is understood as a unit which mechanically is able to couple to the consumption meter, and which mechanically fits onto the housing of the consumption meter to provide a mechanically supportive structure for the communicative coupling between the consumption meter and the transmission coupler module.

Also in the context of the present invention "a conductive element" is understood as a unit which displays electrical conductivity, and which, when arranged with housing adaptor and thus brought into communicative contact with the consumption meter, provides a communication path from the transmitter of the consumption meter for signal transmission. The so-established communication path is a one- or two-way path for either one- or two-way communication between the consumption meter and the transmission coupler module, and may be provided by means of capacitive coupling or magnetic-inductive coupling. The conductive element may constitute an antenna.

Also "near-field coupled" should be understood as providing a communication path for signal transmission by means of capacitive or magnetic-inductive coupling.

The transmitter and the transmission coupler module may alternatively be optically coupled or coupled by a wired connection.

By "the conductive element is removably arranged with the housing adaptor" is meant, that the conductive element may be reversibly and non-destructively removed from and re-assembled to the housing adaptor. Also it should be understood that each of the conductive element and the housing adaptor are self-supporting units. Thus, although the conductive element may be mechanically supported by the housing adaptor during operation according to the invention, it still constitutes a self-supporting unit which may be handled independently of the housing adaptor, e.g. by an installer of the subject transmission system.

By being "removably arranged" with the housing adaptor, the conductive element may, whenever needed, be disassembled from the housing adaptor and handled separately, e.g. during mounting of the consumption meter. Such disassembly allows for a flexible handling of the transmission coupler module.

It should be understood that the coupling between the transmitter and the conductive element of the transmission coupler module is preferably passive, i.e. it does not involve any other electrical components or any circuitry. Alternatively, the coupling may be active, involving other electrical components, e.g. impedance adaptation or matching, or for signal amplification.

According to the invention establishment of the communicative coupling between the transmitter of the consumption meter and the conductive element of the transmission coupler module significantly improves the transmission capability of the consumption meter. Thus, being coupled to the outer surface of the consumption meter, the transmission coupler module and the conductive element therewith are far less likely to be the subject of attenuation of the transmitted signal as otherwise caused by the meter housing and of interference from other electronic components within the consumption meter. Instead the conductive element of the transmission coupler module is able to more freely radiate and transmit any electrical signal than is a transmitter embedded with the consumption meter body.

Chinese Utility Model CN 202158883 U to Xiaobin Tan discloses a valve-controlled wireless remote water meter with a meter device, a control device with a wireless communication unit, and an antenna, wherein the control device housing is removably arranged with the meter device housing, and wherein the antenna housing is in turn removably arranged with control device housing. This piece of prior art, however, is silent as to any conductive element of the antenna being removably arranged with the antenna housing for ease of handling.

Preferably the data transmission system communicates by means radio transmission, and the transmitter is a radio frequency transmitter.

Radio transmission and in turn radio frequency transmission offer reliable, efficient and flexible transmission of consumption data.

In a preferred embodiment of the invention, however, the transmission coupler module further comprises a cable connected to the conductive element by means of a cable connection for connecting the transmission coupler module to an antenna module for further improved transmission.

With the conductive element being connected to a cable and in turn to an antenna module, such antenna module may be arranged at a position with even better transmission than the transmission coupler module per se, and allows for further improved transmission compared to the transmission coupler module per se.

According to the invention it should be understood that the antenna module may be a passive module, i.e. it does not involve any other electrical components or any circuitry. Alternatively, the transmission module may be active, involving electrical components, e.g. for impedance adaptation or matching, or for signal amplification.

In an embodiment of the invention, the cable connection is a fixed connection.

In the present context the "fixed connection" should be understood as a connection between the conductive element and the cable which is integrated, e.g. soldered, and which is not intended for disassembly, and which therefore cannot be undestructively disassembled.

Such fixed connection allows for a minimal impedance of the connection, and also for a connection which is robust against corrosion and any kind of mechanical impact.

In an alternative embodiment of the invention, the cable connection is a releasable connection.

Such releasable connection, which in turn is to be understood as a connection which may be reversibly assembled and disassembled, provides flexibility to the transmission coupler module during mounting or replacement of the consumption meter, e.g. with pit or basement applications.

According to an embodiment of the invention the transmitter has a first capacitive surface, and the conductive element has a second capacitive surface for capacitively coupling the transmitter and the transmission coupler module.

Thus one elegant way of electrically coupling the transmitter and the transmission coupler module is provided by capacitive coupling between capacitive surfaces of each of the transmitter and the module.

The capacitive coupling may preferably be between first and second capacitive surfaces which are arranged in parallel in order to maximize the capacitor plate area and in turn the capacity of the capacitive interface.

Alternatively, but not less preferably, the capacitive coupling may be between first and second capacitive surfaces which are arranged orthogonally to each other in order to minimize capacitor plate distance and maximize the capacity of the capacitive interface.

According to another embodiment of the invention the transmitter has a first inductive structure, and the conductive element has a second inductive structure for inductively coupling the transmitter and the transmission coupler module.

Thus inductive coupling represents another elegant way of electrically coupling the transmitter and the transmission coupler module. By way of inductive coupling each of the transmitter and the conductive element comprise inductive structures like coils.

According to a preferred embodiment of the invention the conductive element is deformable.

In the context of the present invention it is to be understood that a "deformable" conductive element is an element, which may be reversibly deformed and subsequently reshaped, e.g. from a circular to an elliptical shape and vice versa.

Thus, whenever the conductive element is disassembled from the housing adaptor, it may be shaped, e.g. to be able to be led through a narrow opening in a wall, and subsequently reshaped to fit with the housing adaptor, which in turn allows for ease of mounting of the consumption meter and the transmission coupler module.

Preferably with the invention, the consumption meter and the transmission coupler module are arranged in a meter pit or adapted thereto, and the antenna module is arranged with a cover of the meter pit or adapted thereto.

Being arranged in a meter pit, typically deep within the pit body, any signal transmission from a transmitter of a consumption meter is likely to be strongly attenuated due to absorption by the pit walls and the pit cover. By means of the transmission coupler module of the present invention being connected to a antenna module arranged with a pit cover the transmission properties of the system is highly improved.

With another preferred embodiment of the invention the consumption meter and the transmission coupler module are arranged inside a building or adapted thereto, and the antenna module is arranged outside the building or adapted thereto.

As with the pit arrangement, transmission from a transmitter of a consumption meter arranged in a basement, e.g. in a hurricane cellar, suffers from significant signal attenuation from the basement walls. In such case the transmission module may preferably be arranged outside the building, and the cable be fed through an opening in the basement wall. In particular with such arrangement a deformable conductive element is advantageous, as it, once disassembled form the housing adaptor, may be fed through narrow wall openings, eliminating the need for any wider openings, which would otherwise be required to accommodate the housing adaptor.

With the subject invention the housing adaptor preferably has snap fit means for removably fitting onto the housing. The snap fit means provide a simple, fast, secure and reversible mount of the housing adaptor onto the consumption meter housing.

Also with the snap fit means, in case of an accidental disassembly of the housing adaptor from the consumption meter housing, e.g. by pulling the cable when removing the cover from the pit, the housing adaptor is easily and non-destructively detached from the consumption meter housing without any destructive harm to any of the consumption meter and housing adaptor, and may in turn be easily reassembled therewith.

Preferably with the invention, the housing of the consumption meter has a circular surface, and the housing adaptor has an annular structure which fits onto the circular surface.

Beyond allowing for a perfect fit of the housing adaptor onto the circular surface of the consumption meter housing, likely at a cover of the housing, the annular structure of the housing adaptor allows for the adaptor to cover as little as possible of a housing front plate area. In this way the majority of such area is kept accessible, which may display important information to a consumer and to the operator of the consumption meter, e.g. by means of a display.

The consumption meter may comprise an optical eye with the front plate for communication with the transmitter and/or consumption meter. In such case the annular structure of the housing adaptor may as well allow for access to such optical eye. Also the transmission coupler module per se may comprise optical means for communication with the consumption meter, e.g. for provision of system updates to the consumption meter.

In a preferred embodiment of the invention the housing adaptor has a surface with an indentation, and the conductive element is arranged in the indentation for mechanical support of the conductive element.

Preferably the indentation is arranged on one of an outer peripheral surface of the housing adaptor, an inner peripheral surface of the housing adaptor, an upper surface of the housing adaptor and a lower surface of the housing adaptor for maximum transmission.

Preferably the housing of the consumption meter has a collar, and the housing adaptor fits onto or into the collar to be securely and properly arranged onto the housing.

According to a second aspect of the invention a transmission coupler module is provided for use in a data transmission system for transmitting consumption data from a consumption meter with a transmitter, the transmission coupler module comprising:
  a housing adaptor arranged to fit onto an outer surface of
    a housing of the consumption meter; and
  a conductive element arranged with the housing adaptor
    and for being near-field coupled to the transmitter,
  characterized in that
  the conductive element is removably arranged with the housing adaptor.

Similar advantages relate to the transmission coupler module per se of this second aspect as to the data transmission system of the first aspect.

In embodiments of the invention, the consumption meter may be or may be part of a charging consumption meter or utility meter, e.g. a water meter for cold and/or hot water, a gas meter, a heat meter, a cooling meter, an energy meter or a smart meter, where the consumption meter is arranged for measuring consumption data of a supplied utility used as a basis for billing. The consumption meter may be used in connection with district heating, district cooling and/or distributed water supply. The consumption meter may be a legal meter, i.e. a meter which is subdued to regulatory demands. Such regulatory demands may be demands to the precision of the measurements.

By way of measuring principle, the consumption meter may be based on ultrasonic flow measurement and includes an ultrasonic flow meter part. The ultrasonic flow meter may be a transit time flow meter arranged to measure a flow rate of a fluid flowing in a flow channel by use of known operation principles for transit time flow meters, where ultrasonic signals are emitted at one transducer and received at the other transducer, and where the difference in time-of-arrival between oppositely propagating signals is measured and converted into a flow rate. The ultrasonic transducers, which may be piezoelectric transducers are operated by the control circuit, which based on the involved signals generate a signal or value indicative of the flow rate of the fluid. The level of signal treatment of the control circuit may vary from basic signal treatment, where processed signals are output to a further electronic unit for further signal processing, to a complete signal treatment resulting in the determination of the flow rate.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
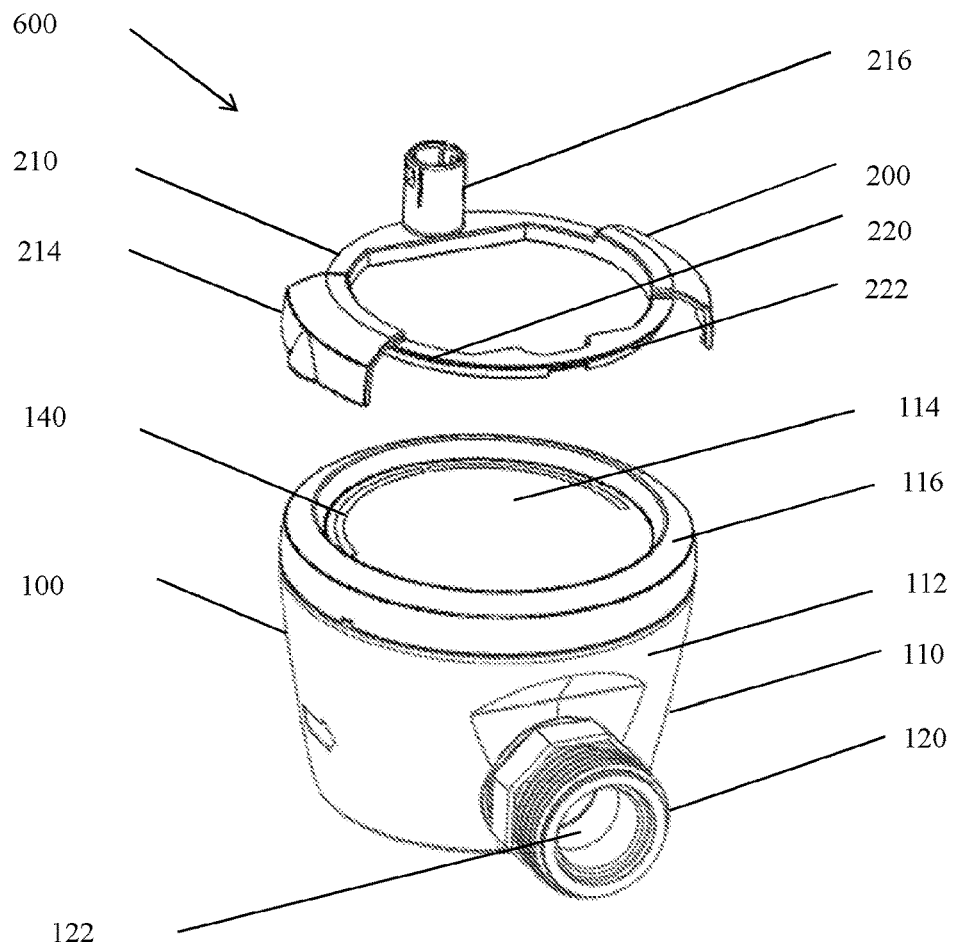
FIG. 1 shows the data transmission system with the consumption meter and the transmission coupler module of the present invention.

FIG. 1 shows the data transmission system 600 with the consumption meter 100 and the transmission coupler module 200 of the present invention. The consumption meter 100 has a housing 110 with an outer surface 112, a cover 114 and a collar 116. The consumption meter 100 further has a flow tube 120 with a through-going opening 122 for passage of a fluid between an inlet and an outlet. With the flow tube 110 two ultrasonic transducers (not shown) are arranged for provision of ultrasonic signals through the fluid flowing in the tube 110. A control circuit (not shown) is arranged within the housing 110 to generate a signal indicative of the volume of a fluid, and a transmitter 140 (with this figure represented by an antenna of the transmitter) is connected to the control circuit for transmitting the signal.

The transmission coupler module 200 has a housing adaptor 210, which fits onto the outer surface 112 of the housing 110 of the consumption meter 100. The transmission coupler module 200 also has a conductive element 220, which is arranged with housing adaptor 210 for near-field coupling to the transmitter 140 when the housing adaptor 210 is arranged onto the housing 110.

The housing adaptor 210 has an annular structure to fit into the collar 116 of the housing 110 of the consumption meter 100. The conductive element 220 is arranged in an indentation 212 at a surface of the housing adaptor 210.

The housing adaptor 210 is made of polycarbonate, and optionally enforced with glass fibres, whereas the conductive element 220 is made from copper. The conductive element 220, arranged as a loop having a diameter of 70 mm, receives radio frequency signals at 868 MHz from the transmitter, matching the impedance of the transmitter without any need for impedance adaptation.

The housing adaptor 210 has snap fit means 214 for removably fitting onto the consumption meter housing 110, and a cable connection support element 216 for receiving and supporting any cable connected to the conductive element 220.

With FIG. 1 the conductive element is arranged as a loop, i.e. that it has an angular extension of 360 degrees. With alternative embodiments (not shown) it may as well have angular extensions in the range of between 30 and 360 degrees, between 30 and 180 degrees, between 60 and 180 degrees, or between 120 and 180 degrees, adapted to match the extension of the antenna of the transmitter, which in turn may be a dipolar antenna or a loop antenna.

Figure 2:
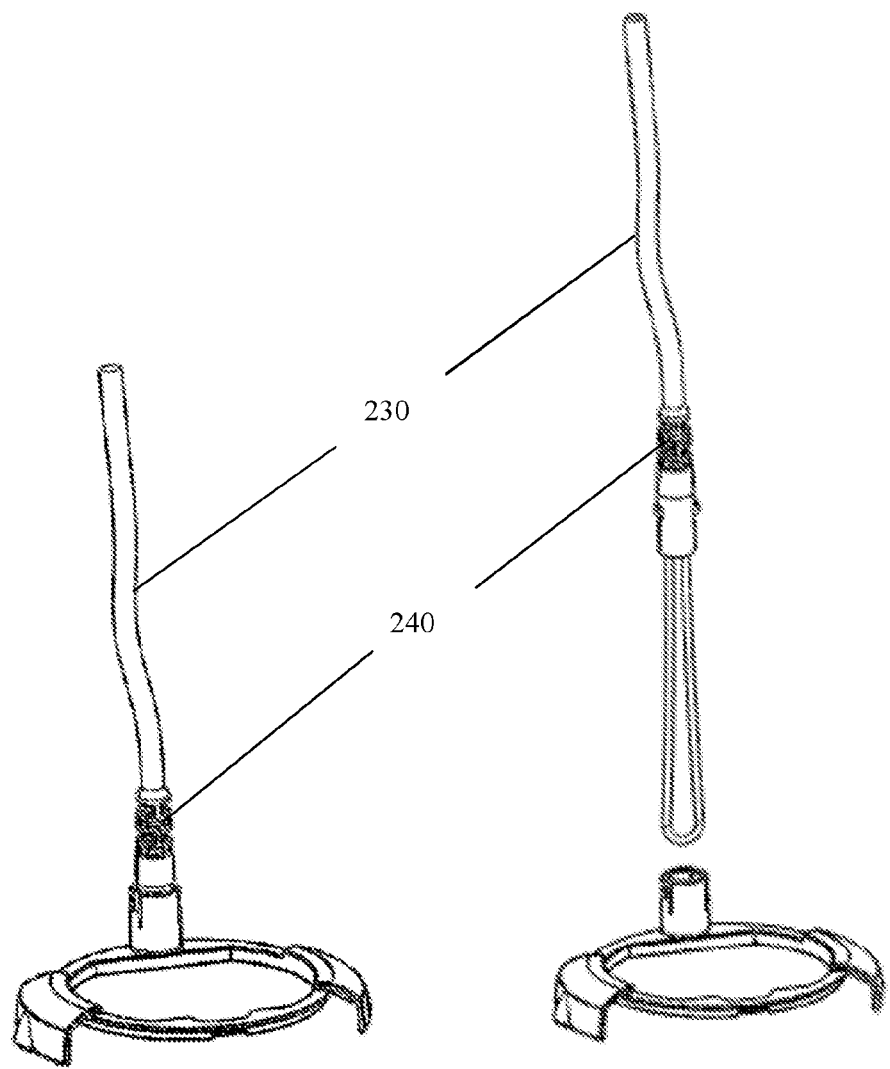
FIG. 2 shows the transmission coupler module.

FIG. 2 shows transmission coupler module 200 in an assembled state (a) and in a disassembled state (b). Thus as shown with (b), the conductive element 220 is removably arranged with the housing adaptor 210. The conductive element 220 is deformable for ease of mounting, e.g. through narrow wall openings. The conductive element 220 is connected to cable 230 via cable connection 240, which is a soldered, fixed connection.

Figure 3:
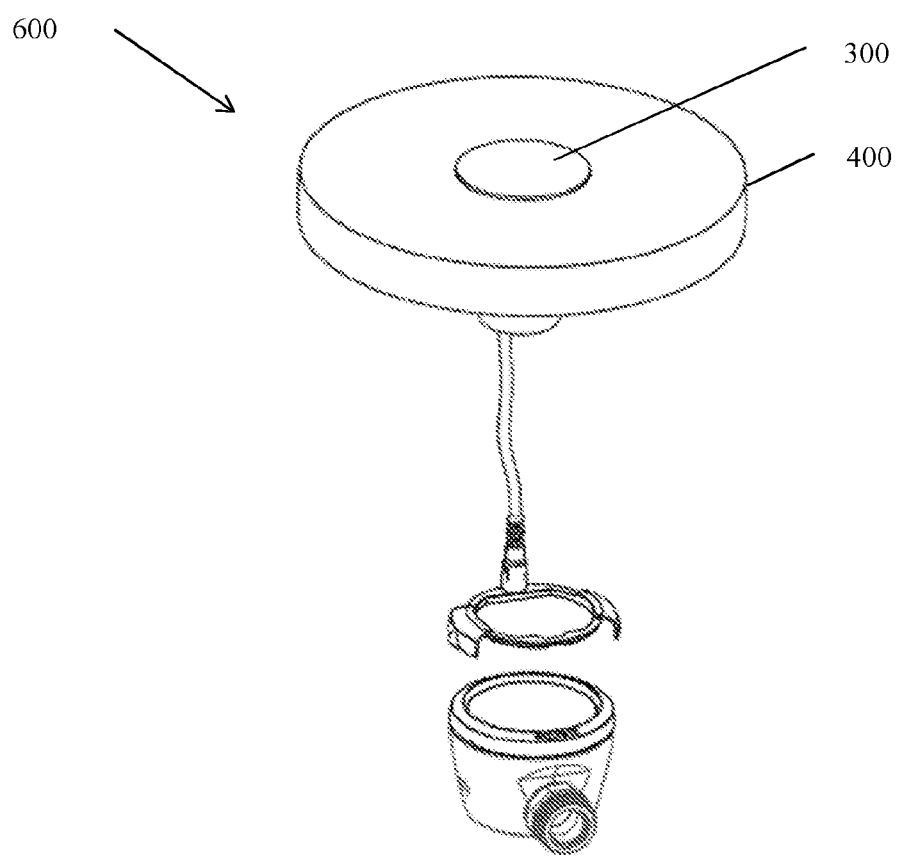
FIG. 3 shows the consumption meter, the transmission coupler module and an antenna module of the present invention, the antenna module being arranged with a pit cover.

FIG. 3 shows the data transmission system 600 covering the consumption meter 100, the transmission coupler module 200 and an antenna transmission module 300 of the present invention, the transmission coupler module 200 and the antenna module 300 being connected via cable 230. The antenna module 300 is arranged with a centre hole of a circular pit cover 400, whereas the consumption meter 100 with the transmission coupler module 200 is arranged within the body of a pit (not shown).

The data transmission system 600 has a transmission performance which compares to the performance of the transmitter 140 per se being arranged at the ground level. Even when the pit is flooded and the consumption meter 100 and the transmission coupler module 200 operate below the water level in the pit, the transmission performance is only insignificantly reduced.

Figure 4:
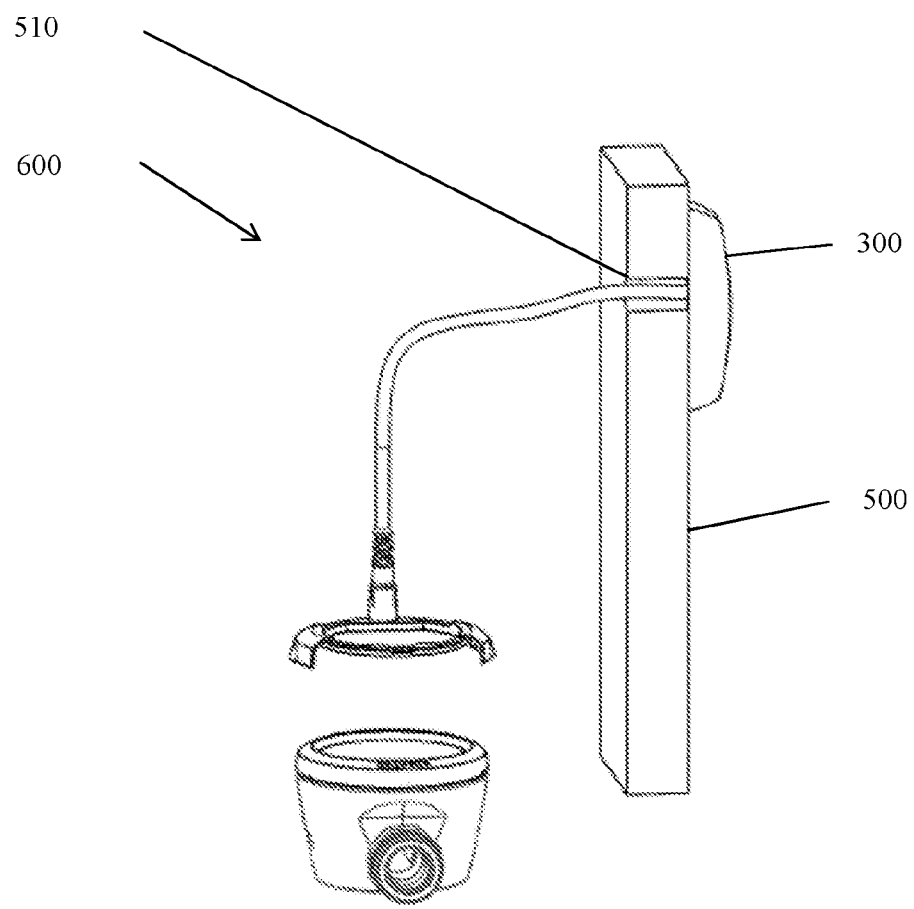
FIG. 4 shows the consumption meter, the transmission coupler module and an antenna module of the present invention, the transmission module being arranged with a wall.

FIG. 4 shows the data transmission system 600 with the consumption meter 100, the transmission coupler module 200 and an antenna module 300 of the present invention. With this figure the antenna module 300 is arranged on one side of a wall 500 and the consumption meter 100 and the transmission coupler module 200 are arranged on the other side of the wall 500, connected via cable 230 which is fed through a narrow hole 510 in the wall 500.

It should be understood that according to the invention the narrow hole 510 suffices for mount of the data transmission system, even if the housing adaptor 210 does not fit with the hole 510. In such case the transmission coupler module 200 is disassembled, the flexible conductive element 220 deformed to be fed through the hole 510, and subsequently reshaped and re-assembled with the housing adaptor 210.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A transmission coupler module for use in a data transmission system for transmitting consumption data from a consumption meter with a transmitter, the transmission coupler module comprising:
a housing adaptor arranged to fit onto an outer surface of a housing in which the consumption meter is arranged, the housing adaptor being accessible from outside the housing of the consumption meter when the housing adaptor is fit on the outer surface of the housing and the consumption meter is in an installed state; and a conductive element arranged with the housing adaptor and for being near-field coupled to the transmitter, wherein the conductive element is a loop or dipolar antenna, reversibly removably arranged with the housing adaptor, and being reversibly deformable, so that when arranged with the housing adaptor, the conductive element is mechanically supported and retained by a surface of the housing adaptor, and when disassembled from the housing adaptor, the conductive element is configured for being reversibly deformed and reshaped during installation of the consumption meter, and for being subsequently reassembled with the housing adaptor when the consumption meter is in the installed state.

2. The transmission coupler module according to claim 1, wherein the transmission coupler module comprises a cable connected to the conductive element by means of a cable connection for connecting the transmission coupler module to an antenna module.

3. The transmission coupler module according to claim 2, wherein the cable connection is a fixed connection.

4. The transmission coupler module according to claim 2, wherein the cable connection is a releasable connection.

5. The transmission coupler module according to claim 1, wherein the housing adaptor has snap fit means for removably fitting onto the housing of the consumption meter.

6. The transmission coupler module according to claim 1, wherein the surface of the housing adaptor has an indentation, and wherein the conductive element is arranged in the indentation.

7. A data transmission system for transmitting consumption data from a consumption meter arranged to measure a volume of a supplied utility, comprising a transmission coupler module according to claim 1, wherein the housing adaptor fits onto an outer surface of a housing of the consumption meter, the consumption meter further comprising:

a control circuit arranged in the housing to generate a signal indicative of the volume of the utility; and a transmitter arranged in the housing, the transmitter being connected to the control circuit and arranged for transmitting the signal indicative of the volume of the utility.

8. The data transmission system according to claim 7, wherein the transmitter is a radio frequency transmitter.

9. The data transmission system according to claim 7, wherein the transmitter has a first capacitive surface, and the conductive element has a second capacitive surface for capacitively coupling the transmitter and the transmission coupler module.

10. The data transmission system according to claim 7, wherein the transmitter has a first inductive structure, and the conductive element has a second inductive structure for inductively coupling the transmitter and the transmission coupler module.

11. The data transmission system according to claim 7, wherein the consumption meter and the transmission coupler module are adapted for being arranged in a meter pit, and wherein the antenna module is adapted for being arranged with a cover of the meter pit.

12. The data transmission system according to claim 7, wherein the consumption meter and the transmission coupler module are adapted for being arranged inside a building, and wherein the antenna module is adapted for being arranged outside the building.

13. The data transmission system according to claim 7, wherein the housing has a circular surface, and wherein the housing adaptor has an annular structure which fits onto the circular surface.

14. The data transmission system according to claim 7, wherein the housing has a collar, and wherein the housing adaptor fits onto or into the collar.

15. A transmission coupler module for use in a data transmission system for transmitting consumption data from a consumption meter with a transmitter, the transmission coupler module comprising:

a housing adaptor arranged to fit onto an outer surface of a housing of the consumption meter, the housing adaptor being accessible from outside the housing of the consumption meter when the housing adaptor is fit on the outer surface of the housing and the consumption meter is in an installed state; and a conductive element arranged with the housing adaptor and for being near-field coupled to the transmitter, wherein the conductive element is a loop antenna, reversibly removably arranged with the housing adaptor, and being reversibly deformable, so that when arranged with the housing adaptor, the conductive element is mechanically supported and retained by a surface of the housing adaptor, and when disassembled from the housing adaptor, the conductive element is configured for being reversibly deformed and reshaped during installation of the consumption meter, and for being subsequently reassembled with the housing adaptor when the consumption meter is in the installed state.

16. The transmission coupler module according to claim 15, wherein the transmission coupler module comprises a cable connected to the conductive element by means of a cable connection for connecting the transmission coupler module to an antenna module.

17. The transmission coupler module according to claim 15, wherein the housing adaptor has snap fit means for removably fitting onto the housing of the consumption meter.

18. The transmission coupler module according to claim 15, wherein the surface of the housing adaptor has an indentation, and wherein the conductive element is arranged in the indentation.

19. A data transmission system for transmitting consumption data from a consumption meter arranged to measure a volume of a supplied utility, comprising a transmission coupler module according to claim 15, wherein the housing adaptor fits onto an outer surface of a housing of the consumption meter, the consumption meter further comprising:

a control circuit arranged in the housing to generate a signal indicative of the volume of the utility; and a transmitter arranged in the housing, the transmitter being connected to the control circuit and arranged for transmitting the signal indicative of the volume of the utility.

20. The data transmission system according to claim 19, wherein the transmitter has a first capacitive surface, and the conductive element has a second capacitive surface for capacitively coupling the transmitter and the transmission coupler module, or wherein the transmitter has a first inductive structure, and the conductive element has a second inductive structure for inductively coupling the transmitter and the transmission coupler module.

* * * * *